United States Patent Office 2,915,432
Patented Dec. 1, 1959

2,915,432

RECOVERY AND CONCENTRATION OF BACITRACIN

Louis Chaiet, Newark, and Thomas J. Cochrane, Jr., Rahway, N.J., assignors to Merck & Co., Inc., Rahway, N.J., a corporation of New Jersey No Drawing. Application October 18, 1955
Serial No. 541,308

3 Claims. (Cl. 167—65)

This invention relates to an improved method for the recovery and concentration of bacitracin from an aqueous solution thereof, such as from a fermentation broth. The invention is particularly applicable to the recovery and concentration of bacitracin from a broth containing a significant quantity of proteinaceous material such as unused and spent soy bean meal—the fresh soy bean meal having been originally introduced into the broth as a nutrient media.

Bacitracin is an antibiotic many of the properties of which are described in U.S. Patent No. 2,498,165 as well as some methods for its production. Those methods involve somewhat tedious solvent and distillation techniques, require relatively large volumes of expensive solvents and produce relatively low yields.

Recovery and concentration of bacitracin from broths containing synthetic nutrient media has been proposed by adsorption on, and elution from, a zeolitic material (such as bentonite, magnesium trisilicate, fuller's earth and diatomaceous earth). This is not a practical process when working with a broth containing a significant quantity of proteinaceous material, as described above.

Other methods have been proposed for the recovery and concentration of bacitracin, but they have various objectionable features, such as one or more of the following: multiplicity and complexity of steps, the need for handling relatively large volumes of solutions (some of them being relatively expensive items), and inability to work satisfactorily with broth having a relatively high content of proteinaceous material.

It is an object of this invention to provide an improved method of recovering and purifying bacitracin from aqueous solutions containing this antibiotic. Another object is to provide an improved method of purifying a relatively concentrated aqueous solution of bacitracin. Other objects will be apparent from the detailed description hereinafter set forth.

In accordance with the present invention, it has been found that bacitracin may be simply, effectively and inexpensively recovered and concentrated from solutions thereof by adsorbing the bacitracin on a synthetic organic cation exchange resin on the hydrogen cycle, and then eluting the bacitracin from the resin with a base. This was unexpected, since the bacitracin is an essentially neutral antibiotic and is somewhat unstable at a pH greater than about 9.0.

In the preferred, and most efficient, form of this invention which is particularly applicable to the recovery and concentration of bacitracin from fermentation broth containing a substantial amount of proteinaceous material such as soy bean meal, the cation exchange resin has a low cross linkage, of the order of 2%.

It is also preferred that the elutriant be a weak base. Dilute aqueous ammonia is particularly preferred, as it produces a salt-free concentrate when the eluate is concentrated by heat under vacuum.

The following examples illustrate specific embodiments of the invention, but it is understood that such examples are not to be considered as limiting the invention.

EXAMPLE 1

The starting material was 2 liters of crude or whole bacitracin broth, assaying 77.6 units/ml. by microbial assay and having a pH of about 8.2. This broth was the end product of the deep fermentation of a strain of *B. subtilis* in an aqueous nutrient medium containing essentially soy bean meal in the ratio of 6 grams of soy bean meal (solvent extracted type, for reasons of economy) to 100 cc. of water. The solids content of the fermentation media at the start of the fermentation cycle was thus 6%, practically all of proteinaceous material. At the end of the cycle the solids content was about 3 to 4%, so this was the solids content of the whole broth used as the starting material of this example.

The 2 liter sample of the whole broth, having a total activity of 155,000 units, was acidified to pH 2 with concentrated sulfuric acid (about 8.3 ml.). Supercel (200 gms.) was added, and the solution filtered, thus removing the mycelia. The filter cake was washed with 400 ml. of water, and the two filtrates were combined, giving a volume of 2,100 ml. assaying 67.2 unit/ml., for a total activity of 141,000 units.

The pH of this filtered broth was adjusted to 4 by adding 10% sodium hydroxide (using approximately 43 ml.) and then the filtered broth was passed downflow through a column of 92 ml. of Duolite C-25 ion exchange resin having a low (2%) cross linkage. This was a cation exchange resin available from the Chemical Process Company of Redwood City, California, and prepared from a matrix produced by the copolymerization of styrene with divinylbenzene. Further details of this resin are described in the paper presented to the 128th meeting of the American Chemical Society on September 14, 1955, by Irving M. Abrams, of the Chemical Process Co., and abstracted in Abstracts of Papers, 128th meeting of the American Chemical Society, Minneapolis, Minn., page 25M. The amount of cross linkage involved is, by accepted practice, defined in terms of percent of divinylbenzene which is used in preparing the resin. Sixteen percent is a highly cross linked resin, while about 5 to 8% is the amount of cross linking that is more or less standard. Hence it is evident that the 2% cross linkage present in the resin used in this example is a significantly low cross linkage.

The resin used was in the form of porous beads having as its functional groups nuclear sulfonic acids. The resin was operated on the hydrogen cycle, and the column had an inside diameter of 3.5 cms.

The filtered broth was passed through this resin column at the rate of 3.1 ml./minute (i.e. 30 minute superficial contact time). The resin column was washed downflow with 100 ml. of water to displace the broth from the column, and then the column was backwashed with water until the effluent was clear. The effluent from the passage of the broth through the column, plus the effluents from the downflow wash and backwash, were combined and are for convenience referred to as "spent broth." The volume of this spent broth was 2,620 ml. and assayed 1.2 units/ml., giving a total of approximately 3,100 units. Hence the resin removed 138,000 units of bacitracin from the 141,000 units of filtered broth passed through it, or 98% of the bacitracin activity.

The resin column was then eluted with 1 N ammonium hydroxide at the rate of 1.84 ml./minute (i.e. 50 minute superficial contact time). The rich cut was collected starting from the time the effluent began to change from a clear to a colored liquid. This was about the time a sample of the effluent, when tested with a picric acid test solution, would produce a precipitate, indicating that the effluent contained bacitracin activity in a concentration exceeding 3 units/ml. The collection of the rich cut was stopped when the effluent became colorless or only very slightly colored. This is about the point at which the picric acid test of a sample of the effluent fails to produce a precipitate.

The picric acid test solution was prepared by stirring about 1 gm. of picric acid in 500 ml. of water for thirty minutes. The clear picric acid solution was decanted and used as the test solution. In making the test, 2 ml. of the test solution were added to 2 ml. of the bacitracin solution containing 1 drop of glacial acidic acid, plus 1 or more additional drops of glacial acetic acid, dependent upon the amount of ammonium hydroxide contained in the bacitracin solution. Turbidity in the bacitracin solution indicated the presence of more than 3 units of bacitracin per milliliter.

The rich cut collected was 212 milliliters having a pH of around 10 to 11 and assayed 498 units/ml., so that it contained a total of 160,000 units of activity. This was 77% of the activity adsorbed on the resin and 76% of the activity present in the filtered broth passed through the resin.

A tail cut of 59 ml. of effluent was collected. This assayed 63 units/ml., so that it contained a total of only 3,720 units of bacitracin activity.

Promptly upon completion of the rich cut, it was placed in an evaporator operated under vacuum so as to drive off excess ammonia and concentrate the solution. This concentration was terminated when the pH of the concentrate was 8.7, at which time the volume was 188 ml. assaying 588 units/ml., so that the total activity of the concentrate was 111,000 units of bacitracin.

While this was a highly concentrated solution of bacitracin, it was desirable to remove, or reduce to negligible proportion, various impurities that were present in this solution before proceeding to a dried finished product.

The concentrated rich cut from the resin column was therefore passed through a column of 92 ml. of Duolite A-7 ion exchange resin (operating on the acetate cycle) at the rate of 1.84 ml./minute (i.e. 50 minute superficial contact time). This was an ion exchange resin available from the Chemical Process Company and is a weakly basic, acid adsorbing resin in the form of porous granules and having as its functional groups primary, secondary and tertiary amines. The resin column was washed with 46 ml. of water. The total effluent was a purified concentrated solution of bacitracin having a volume of 228 ml., a pH of 4.6 and assaying 396 units/ml. so that the solution had a total of 90,300 units of bacitracin activity.

The above process was repeated for a second batch of similar whole bacitracin broth, using a regenerated first resin column and an unregenerated second resin column. The following table compares the results at each step:

As the assays for bacitracin activity were made by microbial methods, and as such methods are recognized as having a possibility of error of up to plus or minus 10%, this is evidently the reason why the total activity of the concentrated rich cut of batch No. 1 in the above table is reported as exceeding by about 5% the total activity of the rich cut before it was concentrated.

The two effluents from the second resin column were combined, giving a total volume of 610 ml. which assayed 322 units/ml., so that the solution had a total of 196,000 units of bacitracin activity. This solution was concentrated by heating under vacuum until the volume was 95 ml., and then defecated by adding 5.8 ml. of a 20% aqueous solution of aluminum sulfate $$(Al_2(SO_4)_3 \cdot 18H_2O)$$

and 0.9 gram of supercel and then adjusting the pH to 7.5 by adding sodium hydroxide solution. After filtering the solution to remove the precipitate, the filtrate was 144 ml. assaying 1430 units/ml., so that the total activity of the filtrate was 206,000 units of bacitracin.

To produce zinc bacitracin from this filtrate, the pH was adjusted to about 4.4 by adding sulfuric acid, then 5 ml. of 10% aqueous solution of zinc chloride was added, followed by adjusting the pH to 7.5 by adding sodium hydroxide. The product, formed as a precipitate in the solution, was removed by filtering, and the filter cake dried under vacuum, yielding 1.9 grams of dried zinc bacitracin having an activity of 76 units per milligram, or a total activity of 144,000 units.

The over-all yield was thus 144,000 units from 283,000 units in the starting material, representing 51%. The yield across the resin column was for batch No. 1, 106,000 units from 141,000 units introduced into the column, representing 75%, and for batch No. 2, 91,800 units from 118,000 units introduced into the column, representing 78%. The decrease in the volume of the bacitracin solution (across the resin column), was from 2100 ml. to 212 ml. in batch No. 1, and from 1970 ml. to 190 ml. in batch No. 2, representing the elimination of 90% of the initial volume for each batch. At the same time, the potency of the solution was increased 7.4 fold for batch No. 1, and 7.7 fold for batch No. 2.

In the steps where concentration was effected by heating and also where the product was dried, these operations were performed under vacuum and at temperatures below 45° C.

The first resin column was regenerated upon the completion of each elution cycle before passing another batch of broth through the column. This was done by washing the column downflow with water, then passing a 5 percent aqueous solution of sodium hydroxide through the column downflow, followed by a water wash, and then by a 5 percent solution of sulfuric acid downflow to return the resin to the hydrogen cycle. The column was water washed downflow until the pH of the effluent rose

*Table 1*

| Material | Batch No. 1 | | | | Batch No. 2 | | | |
|---|---|---|---|---|---|---|---|---|
| | Vol., ml. | Assay, u./ml. | Total Activity, units | pH | Vol., ml. | Assay, u./ml. | Total Activity, units | pH |
| 1. Starting material—whole broth | 2,000 | 77.6 | 155,000 | 8.2 | 2,000 | 64 | 128,000 | 7.6 |
| 2. Filtered broth | 2,100 | 67.2 | 141,000 | | 1,970 | 60 | 118,000 | |
| *First Column* | | | | | | | | |
| 3. Spent broth | 2,620 | 1.2 | 3,100 | | 2,430 | 2.6 | 6,300 | |
| 4. Rich cut (eluate) | 212 | 498 | 106,000 | | 190 | 483 | 91,800 | |
| 5. Tail cut | 59 | 63 | 3,720 | | Not measured | | | |
| 6. Concentrated Rich Cut | 188 | 588 | 111,000 | 8.7 | 180 | 486 | 87,500 | 9.0 |
| *Second Column* | | | | | | | | |
| 7. Effluent | 228 | 396 | 90,300 | 4.6 | Not separately measured | | | | to above 3.0, and then the column was backwashed with water, after which the resin was allowed to settle and the water drained off from the column to just above the top of the resin bed.

The second resin column was regenerated upon the completion of each second batch passed through it. This was done by passing a 5% aqueous solution of sodium hydroxide through the column downflow, followed by a water wash, downflow, until the pH of the effluent dropped to below 11.0. Then a 5% aqueous solution of acetic acid was passed through the column, downflow, followed by a water wash, downflow, until the pH of the effluent rose to above 4.0. The column was then backwashed with water, after which the resin was allowed to settle and the water drained off from the column to just above the top of the resin bed.

EXAMPLE 2

Two liters of bacitracin whole broth similar to that used in Example 1, and assaying 85 units/ml., was acidified to pH 3 with sulfuric acid and filtered with supercel admix. The filtered broth was passed downflow through a column containing 75 ml. of Duolite C–25 2% cross-linked resin on the hydrogen cycle at a rate of 4 ml./minute, followed by 150 ml. of water as a wash. The bacitracin was eluted from the resin with 1 N ammonium hydroxide. The rich cut, of 130 ml., was then neutralized with sulfuric acid. The following table shows the results:

Table 2

| Material | Vol., ml. | Assay, u./ml. | Total Activity, units |
|---|---|---|---|
| 1. Whole broth | 2,000 | 85 | 170,000 |
| 2. Filtered broth | 2,460 | 70 | 172,000 |
| 3. Spent broth | 2,470 | 11.8 | 29,100 |
| 4. Rich Cut | 130 | 965 | 125,000 |
| 5. Tail Cut | 38 | 14.7 | 560 |

The rich cut was then purified by solvent extraction techniques, as follows: The pH of the solution was adjusted to 7.2 by adding ammonium hydroxide, then 26 ml. of n-butanol was added and the mixture stirred so that much of the bacitracin activity was extracted from the water into the butanol, while much of the impurities remained in the aqueous solution. After settling, the butanol layer was removed, and the process repeated four times using 13 ml. of butanol each time. The combined butanol extracts had a volume of 77 ml. and assayed 1520 units/ml. and contained a total of 117,000 units of activity.

The raffinate (i.e. water solution), after evaporation to 105 ml., assayed only 35 units/ml. so that it contained only 3650 units of activity.

The bacitracin was recovered from the butanol by removing the butanol by azeotropic distillation with water under vacuum, with the maximum temperature about 35–40° C. The resulting aqueous solution of bacitracin was 90 ml., assaying 1380 units/ml., for a total activity of 124,000 units.

This solution of bacitracin was further purified by adding 5 ml. of 20% aqueous solution of aluminum sulfate ($Al_2(SO_4)_3 \cdot 18H_2O$) and 1 gram of supercel, then adjusting the pH to 7.5 by adding sodium hydroxide solution, and finally filtering the solution to remove the precipitate. The filter cake was washed with water, and the combined filtrate was 150 ml. assaying 690 units/ml., for a total activity of 103,000 units.

The filtrate, after cooling for 20 hours in the refrigerator, was concentrated to 90 ml. by heating under vacuum. The bacitracin in the filtrate was converted to zinc bacitracin by adding 2.2 ml. of 10% aqueous solution of zinc chloride, following by adjusting the pH of the solution to 7 and stirring for 30 minutes. The solution was then filtered and the filter cake, after washing, was dried under vacuum, yielding 1.21 grams of dried zinc bacitracin having an activity of 80 units per milligram, for a total activity of 97,000 units. The over-all yield was thus 97,000 units from 170,000 units in the starting material, representing 57%. The yield across the resin column was 125,000 units from 172,000 units introduced into the column, representing 78%. The decrease in the volume of the bacitracin solution (across the resin column), was from 2460 ml. to 130 ml., representing the elimination of 95% of the initial volume, while the potency of the solution was increased 13.8 fold.

EXAMPLE 3

2670 ml. of bacitracin whole broth similar to that used in Example 1 was acidified to pH 3 with sulfuric acid, and after adding 10% by weight of supercel as an admix, was filtered. The filter cake was washed with 534 ml. of water, and the combined filtrate was passed downflow through a column containing 92 ml. of Amberlite XE–89 cation exchange resin on the hydrogen cycle at a rate of 6.1 ml./minute (i.e. 15 minute superficial contact time).

This resin is a carboxylic acid type of cation exchange resin supplied by the Rohm & Haas Company, of Philadelphia, Pa., having a dissociation constant about 5 times that for the Amberlite IRC–50 cation exchange resin supplied by the same company (also of the carboxylic acid type).

After the passage of the filtered broth through the column, the resin was removed from the column and placed in a beaker and 6 N ammonium hydroxide added to the resin in small amounts, while stirring, to adjust the pH of the resin to from 8.5 to 9. After the pH had remained constant at 8.5 for at least a 15 minute interval without further addition of ammonium hydroxide, the resin was replaced in the column and washed with water until the eluate became colorless. The following table shows the results:

Table 3

| Material | Vol., ml. | Assay, u./ml. | Total Activity, units |
|---|---|---|---|
| 1. Whole broth | 2,670 | 56.4 | 151,000 |
| 2. Filtered broth | 2,300 | 36.8 | 84,600 |
| 3. Spent broth | 2,300 | 4.5 | 10,300 |
| 4. Eluate | 210 | 336 | 70,600 |

The yield across the resin column was thus 70,600 units from 84,600 units introduced into the column, representing 83%. The decrease in the volume of the bacitracin solution was from 2300 ml. to 210 ml., representing the elimination of 91% of the initial volume, while the potency of the solution was increased 9.2 fold.

EXAMPLE 4

One liter of bacitracin whole broth similar to that used in Example 1, was acidified to pH 3 with sulfuric acid, and after adding 10% by weight of supercel as an admix, was filtered. The filter cake was washed with 200 ml. of water, and the combined filtrate was passed downflow through a column containing 20 ml. of Dowex 50–X1 cation exchange resin on the hydrogen cycle at a rate of 1.3 ml./minute (i.e. 15 minute superficial contact time).

This resin was available from the Dow Chemical Company, of Midland, Michigan, and was prepared from the copolymerization of styrene with divinylbenzene, the "X1" indicating that it has a 1% cross linkage. The resin has a sulfonic acid grouping as its functional group and is a strongly acidic cation exchange resin.

After the passage of the filtered broth through the column, the resin was removed from the column and placed in a beaker and 6 N ammonium hydroxide added to the resin in small amounts, while stirring, to adjust the pH of the resin to 8.5. After the pH had remained constant at 8.5 for about a 15 minute interval without further addition of ammonium hydroxide, the resin was replaced in the column. One volume of water was then introduced into the column, followed by a 1 N solution of ammonium hydroxide. The effluent that was collected until the pH of the effluent rose to 9, constituted the eluate or rich cut. The following table shows the results:

*Table 4*

| Material | Vol., ml. | Assay, u./ml. | Total Activity, units |
|---|---|---|---|
| 1. Whole broth | 1,000 | 60.0 | 60,000 |
| 2. Filtered broth | 940 | 39.6 | 37,200 |
| 3. Spent broth | 1,010 | 7.1 | 7,200 |
| 4. Eluate | 82 | 250 | 20,500 |

The yield across the resin column was thus 20,500 units from 37,200 units introduced into the column, representing 55%. The decrease in the volume of the bacitracin solution was from 940 ml. to 82 ml., representing the elimination of 91% of the initial volume, while the potency of the solution was increased 6.3 fold.

EXAMPLE 5

500 ml. of filtered bacitracin broth (derived from whole broth similarly as described in Example 1), was passed downflow through a column containing 20 ml. of Dowex 50-X1 cation exchange resin on the hydrogen cycle at a rate of 1 ml./minute (i.e. 20 minutes superficial contact time). This resin is described in detail in Example 4.

Instead of eluting the activity from the resin batchwise, as described in Example 4, the activity was eluted from the resin by column operation, similarly as described in Example 1, using 1 N ammonium hydroxide. The following table shows the results:

*Table 5*

| Material | Vol., ml. | Assay, u./ml. | Total Activity, units |
|---|---|---|---|
| 1. Filtered broth | 500 | 49 | 24,400 |
| 2. Spent broth | 495 | 1.5 | 740 |
| 3. Eluate | 55 | 242 | 13,300 |

The yield across the resin column was thus 13,300 units from 24,400 units introduced into the column, representing 55%. The decrease in the volume of the bacitracin solution was from 500 ml. to 55 ml., representing the elimination of 89% of the initial volume, while the potency of the solution was increased 5.0 fold.

EXAMPLE 6

2080 ml. of filtered bacitracin broth (derived from whole broth similarly as described in Example 1) was passed downflow through a column containing 70 ml. of Duolite C-10 cation exchange resin on the hydrogen cycle at a rate of 3.5 ml./minute (i.e. 20 minute superficial contact time).

This resin was available from the Chemical Process Company and was prepared from a highly expanded phenolic matrix with omega sulfonic acid as its functional group. It is supplied in highly porous granules.

After washing the resin column similarly as described in Example 1, the activity was eluted from the resin by passing 1 N ammonium hydroxide through the resin. The following table shows the results:

*Table 6*

| Material | Vol., ml. | Assay, u./ml. | Total Activity, units | Purity, u./mg. |
|---|---|---|---|---|
| 1. Filtered broth | 2,080 | 25.6 | 53,300 | 0.8 |
| 2. Spent broth | 2,230 | 1.7 | 3,800 | |
| 3. Eluate | 395 | 72 | 28,400 | 4.03 |

The yield across the resin column was thus 28,400 units from 53,300 units introduced into the column, representing 53%, while the purity of the active material, in terms of activity per total solid content, was increased from 0.8 to 4.03, representing a 5.1 fold increase. The decrease in the volume of the bacitracin solution was from 2080 ml. to 395 ml., representing the elimination of 81% of the initial volume, while the potency of the solution was increased 2.8 fold.

EXAMPLE 7

1540 ml. of filtered bacitracin broth (derived from whole broth similarly as described in Example 1) was passed downflow through a column containing 39 ml. of Duolite C-25 cation exchange resin having a cross linkage of around 6-8%. The resin was on the hydrogen cycle and the rate of flow through it was 1.9 ml./minute (i.e. 20 minute superficial contact time).

This resin was available from the Chemical Process Company, and as with the Duolite C-25 resin described in Example 1, is prepared from a matrix produced by the copolymerization of styrene with divinylbenzene, with nuclear sulfonic acid as its functional group. The resin used in this Example 7 differed from that used in Example 1, however, in that it was more highly cross linked.

After washing the resin column similarly as described in Example 1, the activity was eluted from the resin by passing ice cold 1 N ammonium hydroxide through the resin. The following table shows the results:

*Table 7*

| Material | Vol., ml. | Assay, u./ml. | Total Activity, units |
|---|---|---|---|
| 1. Filtered broth | 1,540 | 37.7 | 58,100 |
| 2. Spent broth | 1,760 | 15.8 | 27,800 |
| 3. Eluate | 60 | 142 | 8,500 |

The yield across the resin column was thus 8,500 units from 58,100 units introduced into the column, representing 15%. The decrease in the volume of the bacitracin solution was from 1540 ml. to 60 ml., representing the elimination of 96% of the initial volume, while the potency of the solution was increased 3.8 fold.

EXAMPLE 8

200 ml. of filtered bacitracin broth (derived from whole broth similarly as described in Example 1), was passed downflow through a column containing 20 ml. of Amberlite 1RC-50 cation exchange resin. The resin was on the hydrogen cycle and the rate of flow through it was 1 ml./minute (i.e. 20 minute superficial contact time).

This resin was a carboxylic acid type of cation exchange resin supplied by the Rohm & Haas Company in which the exchange groups are weakly acidic, and which exhibits high capacity and great affinity for hydrogen ions.

After washing the resin column similarly as described in Example 1, the activity was eluted from the resin by passing 1 N ammonium hydroxide through the resin. The following table shows the results:

Table 8

| Material | Vol., ml. | Assay, u./ml. | Total Activity, units | Purity, u./mg. |
|---|---|---|---|---|
| 1. Filtered broth | 200 | 44 | 8,800 | 1.3 |
| 2. Spent broth | 216 | 7.4 | 1,600 | |
| 3. Eluate | 156 | 30 | 4,680 | 11 |

The yield across the resin column was thus 4680 units from 8800 units introduced into the column, representing 53% while the purity of the active material, in terms of activity per total solid content, was increased from 1.3 to 11, representing an 8.5 fold increase. The decrease in the volume of the bacitracin solution was from 200 ml. to 156 ml., representing the elimination of 22% of the initial volume, while the potency of the solution decreased somewhat, to about 68% of the initial potency.

SUMMARY OF EXAMPLES

The results of the foregoing examples are summarized in the following table:

Table 9
RECOVERY AND CONCENTRATION OF BACITRACIN

| Example | Cation Exchange Resin (On H+ Cycle) | Type of Elution (With Weak Base) | Yield Across Column, Percent | Decrease in Volume of Liquid (Amount of Initial Volume Eliminated), Percent | Approximate Increase in Potency of Solution | Approximate Increase in Purity (Based on Solids) |
|---|---|---|---|---|---|---|
| 1 | Duolite C-25; 2% cross linked | Column | 55 | 90 | 7X and 8X | Not determined. |
| 2 | do | do | 78 | 95 | 14X | Do. |
| 3 | Amberlite XE-89 | Batch | 83 | 91 | 9X | Do. |
| 4 | Dowex 50-X1; 1% cross linked | do | 55 | 91 | 6X | Do. |
| 5 | do | Column | 55 | 89 | 5X | Do. |
| 6 | Duolite C-10 | do | 53 | 81 | 3X | 5X. |
| 7 | Duolite C-25; about 6-8% cross linked | do | 15 | 96 | 4X | Not determined. |
| 8 | Amberlite IRC-50 | do | 53 | 22 | 1X | 9X. |

What is claimed is:

1. The process of recovering and concentrating bacitracin from aqueous filtered fermentation broth containing on the order of 3% proteinaceous solids which comprises intimately contacting the broth with a synthetic organic cation exchange resin having as its functional groups nuclear sulfonic acids and having a cross linkage of the order of 1 to 2 percent, with said resin being in the hydrogen form, and eluting the adsorbed bacitracin from said resin with a weak base.

2. The process according to claim 1 in which the pH of the broth is adjusted to about 4 before it contacts the resin.

3. The process of recovering and concentrating bacitracin elaborated by the fermentation of *B. subtilis* in an aqueous solution containing about 6% soy bean meal as the essential nutrient medium, which comprises filtering the whole broth to remove the mycelia, acidifying the filtered broth to about pH 4, passing the filtered broth through a column of a cation exchange resin of the styrene-divinylbenzene type having nuclear sulfonic acids as its functional groups and having a cross linkage of the order of 1 to 2% and operating in the hydrogen form, eluting the absorbed bacitracin from said resin with dilute aqueous ammonia, and concentrating the rich cut of the eluate by heating it under vacuum at not over 50° C. until the pH of the solution is less than 9.2.

References Cited in the file of this patent

UNITED STATES PATENTS

| | | |
|---|---|---|
| 2,528,022 | Van Dolah et al. | Oct. 31, 1950 |
| 2,582,921 | Charney | Jan. 15, 1952 |
| 2,667,441 | Nager | Jan. 26, 1954 |
| 2,776,240 | Shortridge | Jan. 1, 1957 |